US012319349B2

(12) United States Patent
Huelsen et al.

(10) Patent No.: US 12,319,349 B2
(45) Date of Patent: Jun. 3, 2025

(54) VEHICLE ROOF WITH SENSOR MODULE AND TRIM ELEMENT

(71) Applicant: Webasto SE, Stockdorf (DE)

(72) Inventors: Michael Huelsen, Stockdorf (DE); Freddy Geeraerds, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 320 days.

(21) Appl. No.: 17/923,437

(22) PCT Filed: Apr. 28, 2021

(86) PCT No.: PCT/EP2021/061126
§ 371 (c)(1),
(2) Date: Dec. 12, 2022

(87) PCT Pub. No.: WO2021/228552
PCT Pub. Date: Nov. 18, 2021

(65) Prior Publication Data
US 2023/0192193 A1    Jun. 22, 2023

(30) Foreign Application Priority Data

May 11, 2020   (DE) ...................... 10 2020 112 678.6

(51) Int. Cl.
| | |
|---|---|
| *B62D 25/06* | (2006.01) |
| *B60R 11/04* | (2006.01) |
| *B60R 13/02* | (2006.01) |
| *B60R 16/023* | (2006.01) |
| *B60R 16/037* | (2006.01) |

(Continued)

(52) U.S. Cl.
CPC .............. *B62D 25/06* (2013.01); *B60R 11/04* (2013.01); *B60R 13/0212* (2013.01); *B60R 16/0231* (2013.01); *B60R 16/037* (2013.01); *B62D 27/026* (2013.01); *G01S 7/4813* (2013.01); *G01S 13/931* (2013.01); *G01S 17/931* (2020.01); *B60Y 2410/115* (2013.01)

(58) Field of Classification Search
CPC .... G01S 7/4813; G01S 17/931; G01S 13/931; H01Q 1/325; B62D 25/06; B60R 11/04
USPC .......................................................... 296/210
See application file for complete search history.

(56) References Cited

U.S. PATENT DOCUMENTS

| | | | |
|---|---|---|---|
| 11,592,529 B2 * | 2/2023 | Diehl ...................... G01S 7/497 |
| 2017/0261273 A1 | 9/2017 | Maranville et al. | |

(Continued)

FOREIGN PATENT DOCUMENTS

DE     102019105339 A1     9/2020

OTHER PUBLICATIONS

Written Opinion of the International Searching Authority for PCT/EP2021/061126; Mailed Nov. 24, 2022, in English (6 pages).

(Continued)

*Primary Examiner* — Dennis H Pedder
(74) *Attorney, Agent, or Firm* — Fitch, Even, Tabin & Flannery, LLP

(57) ABSTRACT

A vehicle roof having a roof skin arrangement which may have at least one cover element and the vehicle roof having at least one sensor module having at least one environment sensor for detecting a vehicle environment which is at least partially covered by the cover element, the cover element being limited by an edge gap via which air, in particular cooling air, for the sensor module flows under the cover element.

12 Claims, 4 Drawing Sheets

(51) Int. Cl.
*B62D 27/02* (2006.01)
*G01S 7/481* (2006.01)
*G01S 13/931* (2020.01)
*G01S 17/931* (2020.01)

(56) References Cited

U.S. PATENT DOCUMENTS

| | | |
|---|---|---|
| 2019/0210546 A1 | 7/2019 | Slovesko |
| 2019/0248300 A1 | 8/2019 | Takagi |
| 2019/0277949 A1 | 9/2019 | Krishnan et al. |
| 2020/0101905 A1 | 4/2020 | Taylor et al. |
| 2022/0161860 A1 | 5/2022 | Friedrich et al. |

OTHER PUBLICATIONS

International Search Report for PCT/EP2021/061126 mailed Jul. 27, 2021, in English and German (6 pages).

Office Action issued in corresponding Chinese Application No. 202180034737.3; mailed Dec. 30, 2024; In Chinese with English machine translation (14 pages).

\* cited by examiner

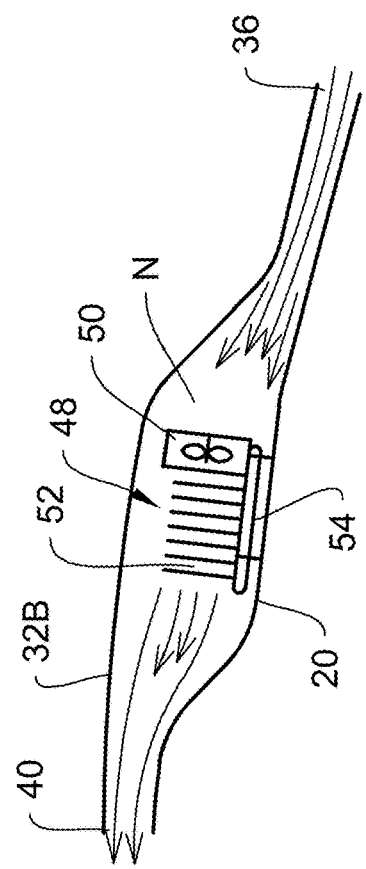
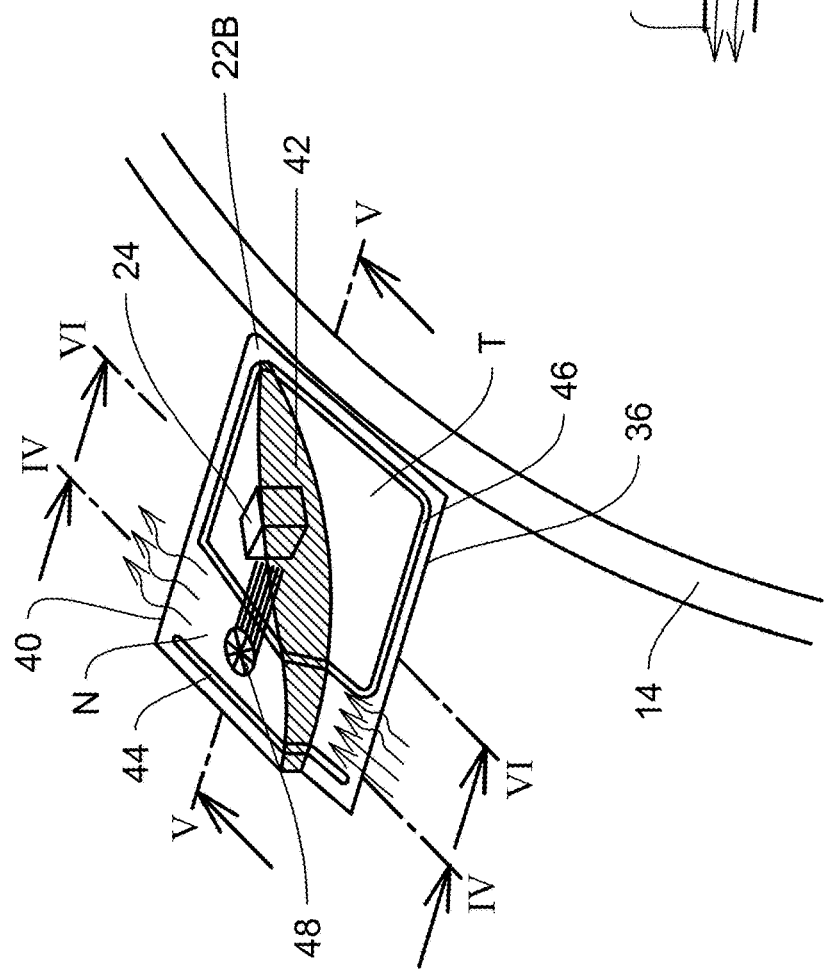

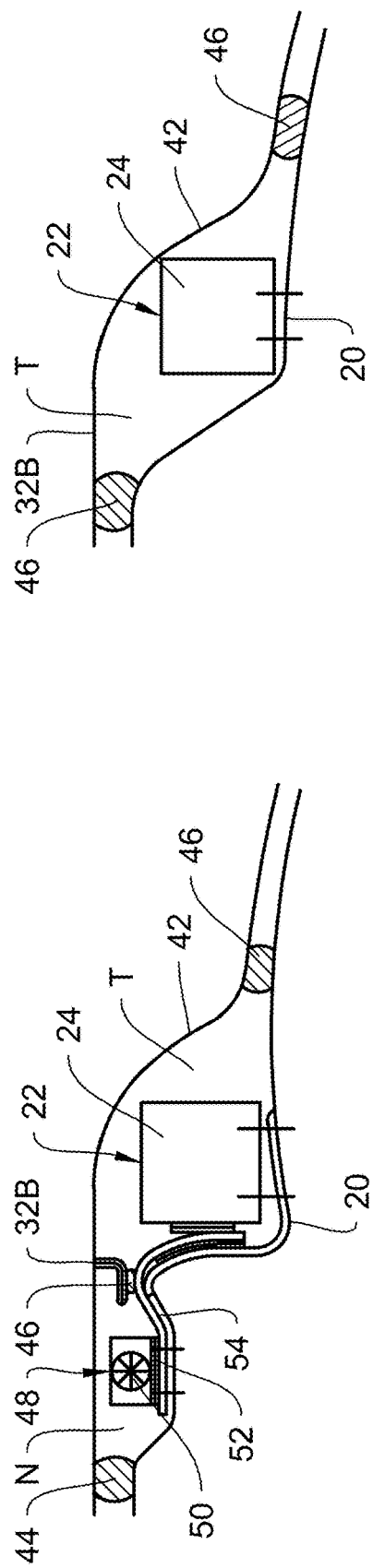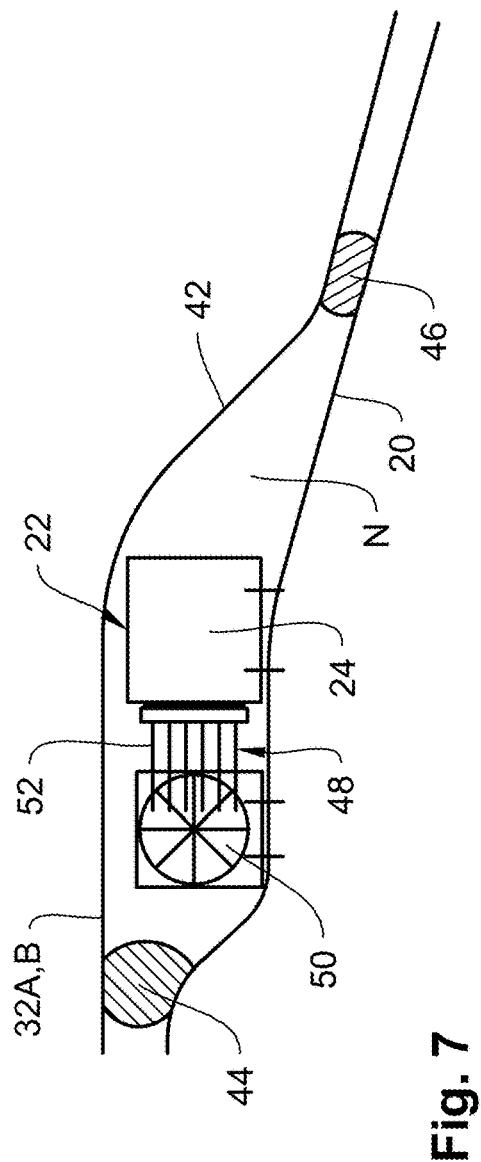

VEHICLE ROOF WITH SENSOR MODULE AND TRIM ELEMENT

CROSS-REFERENCE TO RELATED APPLICATION

This application is a U.S. national phase application filed under 35 U.S.C. § 371 of International Application No. PCT/EP2021/061126, filed Apr. 28, 2021, designating the United States, which claims priority from German Patent Application Number 10 2020 112 678.6 filed on May 11, 2020, which are hereby incorporated herein by reference in its entirety for all purposes.

FIELD

The invention relates to a vehicle roof comprising a roof skin arrangement having at least one cover element and the vehicle roof comprising at least one sensor module having at least one environment sensor for detecting a vehicle environment and the invention relates to a motor vehicle having a vehicle roof of this type.

BACKGROUND

A vehicle roof of the type mentioned above is known from practice and is in particular part of a passenger car. This vehicle roof can comprise a supporting structure and a roof skin arrangement which overstretches the supporting structure and can be formed as a roof module which, as a separate component, can be fitted on roof rails, which are part of a vehicle body forming a vehicle shell structure. The roof skin arrangement can have a roof opening which can be closed or opened by means of a roof opening system. At the front of the roof opening, the roof skin arrangement can comprise a cover element which extends in the transverse roof direction and is associated to a front header of the respective vehicle. Generally, the roof skin arrangement extends to the roof opening. Alternatively, the vehicle roof can also be formed as an entirely fixed roof in which the roof skin arrangement is a cover element continuously formed in one piece.

Furthermore, providing a vehicle roof with a sensor technology having a sensor module having several environment sensors for detecting a vehicle environment is known. The sensor module, by means of which the vehicle environment can be detected and analyzed, allows the respective motor vehicle to be driven autonomously or semi-autonomously. To this end, the sensor module is fitted on the vehicle roof or the roof skin with known vehicle roofs, such that it forms the highest point of the respective vehicle from where the vehicle environment is easily visible. To ensure that the environment sensors detect the vehicle environment error-free at all times, their temperature must be kept within a certain range.

SUMMARY

The object of the invention is to provide a vehicle roof of the kind described above in which the sensor module can be air-conditioned without the optical appearance of the roof being impaired by air-conditioning features.

According to the invention, this object is attained by the vehicle roof having the features of patent claim 1.

The invention proposes a vehicle roof with a roof skin arrangement comprising at least one cover element which at least partially covers a sensor module for detecting an environment, the cover element being limited by an edge gap via which air, in particular cooling air, for the sensor module can flow under the cover element. Thus, the vehicle roof according to the invention can in particular utilize the airstream that can flow under the cover element via the edge gap and there it can be used as cooling air for the sensor module. Cooling features which can be seen from the outside of the roof for the sensor module are not necessary because of the edge gap, which is a transition to an additional vehicle part and a ventilation slit. For example, the cover element does not need to be provided with cooling ribs or the like or needs only a few cooling ribs.

In a specific embodiment of the vehicle roof according to the invention, the edge gap extends in the transverse roof direction. Thus, cooling air can flow under the cover element over the entire length of the edge gap or only at suitable, advantageous positions and can be provided for the sensor module for air-conditioning.

In a specific embodiment of the vehicle roof according to the invention, the roof skin comprises a front cover extending in the transverse roof direction which forms a front edge of the vehicle roof and has several cover segments, of which one forms the cover element, which covers the sensor element at least partially. The edge gap, via which the cooling air can flow under the cover element and which is disposed on an upper edge of a windshield of the respective vehicle, for example, is formed on the front edge or on a lateral edge of the cover element. The cooling air can stream out, preferably via edge gaps which laterally limit the cover element with respect to the longitudinal direction of the vehicle and which can also be disposed between the cover segments of the cover and also via an edge gap limiting the cover element at the rear. Thus, the cooling air does not accumulate under the cover element, but instead it can stream out via the outlet gap formed for this purpose.

To define a clear flow path of the cooling air under the cover element, at least two glue beads and/or sealing lips and/or at least one separating wall and/or at least one other separating element can be provided via which the cover element is connected to a support structure. For example, the support structure is formed by a roof frame on which the roof skin arrangement is also mounted.

To optimize the cooling of the sensor module, it can be connected to a temperature controller which is disposed in the flow path of the cooling air. For example, the temperature controller comprises a fan and/or an airflow generator and/or a heat sink and/or a heat exchanger.

In a preferred embodiment of the vehicle roof according to the invention, a wet area and a dry area are formed under the cover element. The temperature controller is disposed in particular in a wet area, which is located under the cover element so as to not be visible from the outside, whereas the sensor module is disposed in particular in the dry area. To ensure the cooling by means of the cooling air flowing under the cover element, the temperature controller and the sensor module are connected to each other via a temperature-control bridge, which comprises a cooling line in which a coolant is guided and/or heat pipes in a specific embodiment. Further elements which can transfer heat/cold can also be comprised, for example, a vehicle shell structure part and/or a roof frame part and/or another sheet metal part.

Additionally, a discharge system for moisture can be provided under the cover element.

The environment sensor of the sensor module can have various designs, use electromagnetic radiation and/or acoustic waves and comprise, for example, a lidar sensor, a radar sensor, an optical sensor, such as a camera, an antenna device and/or the like.

If the environment sensor is a lidar sensor, it preferably operates in a wavelength range of approximately 905 nm or also approximately 1550 nm. A camera used as an environment sensor can operate in the wavelength range of visible light and/or in the infrared range.

A preferred embodiment of the vehicle roof according to the invention is formed as a roof module. In an integrated manner, such a roof module forms a component in which components necessary for the respective vehicle being driven autonomously or semi-autonomously are accommodated. As a compact modular unit, the roof module, in which a plurality of functional elements can thus be integrated, is connected to a vehicle body or a vehicle shell structure comprising roof rails, such as roof side rails, by a vehicle manufacturer. The vehicle roof formed as a roof module is thus a sensor roof module or roof sensor module (RSM) which allows the respective vehicle to be driven autonomously or semi-autonomously.

A vehicle which is provided with the roof according to the invention and which is an autonomously driving vehicle drives independently in an autonomous driving mode, at least without significant interference from the driver. In a semi-autonomous driving mode, the vehicle roof according to the invention forms a part of a driver assistance system, for example.

The vehicle roof according to the invention can be provided with a transparent fixed roof portion and/or a roof opening system for a roof opening.

In particular, the vehicle roof according to the invention is a roof of a passenger car. However, it can also be a roof of a commercial vehicle designed as a delivery vehicle, a bus, an autonomously driving minibus, such as a people mover, or even a tractor unit, for example.

A sensor see-through portion via which the environment sensor can communicate with the vehicle environment can be formed on the cover element which covers the sensor module at least partially. The sensor see-through portion which is formed in one piece and part of the cover element or which can be an insert of the cover element or a part of the sensor module, for example, part of a sensor module housing, is advantageously transparent for the wavelengths used by the environment sensor. In particular, the sensor see-through portion is designed such that signals of the environment sensor between a wavelength range of 300 nm and 2000 nm can pass through. Additionally, it is also particularly advantageous if the sensor see-through portion is transparent for radar beams.

The invention also relates to a motor vehicle which comprises a vehicle roof of the type described above and whose vehicle roof is preferably formed as a roof module which is connected to a vehicle shell structure and which is formed as a sensor roof module or roof sensor module.

Further advantages and advantageous embodiments of the subject matter of the invention can be derived from the description, the drawings and the patent claims.

Embodiments of a vehicle roof according to the invention are illustrated schematically simplified in the drawings and are described in more detail hereinafter.

BRIEF DESCRIPTIONS OF THE DRAWINGS

FIG. 3 shows an enlarged view of the area III in FIG. 2;

FIG. 4 shows a sectional view of the arrangement according to FIG. 3 along line IV-IV in FIG. 3;

FIG. 5 shows a sectional view of the arrangement according to FIG. 3 along line V-V in FIG. 3;

FIG. 6 shows a sectional view of the arrangement according to FIG. 3 along line VI-VI in FIG. 3; and FIG. 7 shows a sectional view corresponding to FIG. 5 of an alternative embodiment of a vehicle roof.

DETAILED DESCRIPTION

Figure 1:
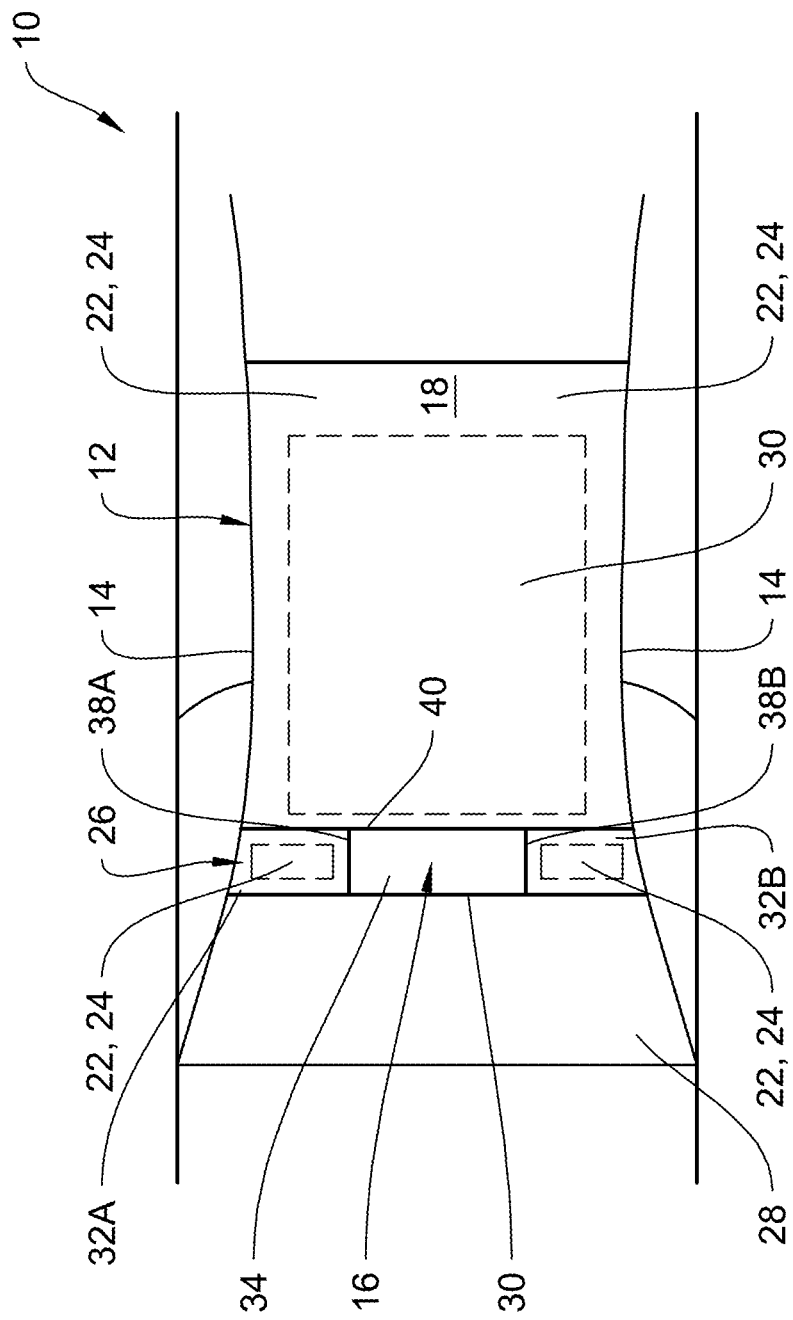
FIG. 1 shows a top view of a motor vehicle having a vehicle roof according to the invention.

FIGS. 1 to 6 show a motor vehicle 10 which is formed as a passenger car and provided with a vehicle roof 12, which comprises a roof side rail 14 on either side of a longitudinal center roof plane which is part of a vehicle body forming a shell. Between roof side rails 14, vehicle roof 12 comprises a roof module 16 which is rigidly connected to roof side rails 14 forming a shell supporting structure.

Roof module 16 comprises a roof skin 18 which is disposed on a support structure 20 which is a roof frame and forms an intersection of roof module 16 with roof side rails 14.

Roof module 16 is formed as a sensor roof module or roof sensor module (RSM) which is equipped with devices which allow the respective vehicle to be driven autonomously. To this end, roof module 16 has a sensor technology which comprises a sensor module 22 in each of the at least two front corner portions of roof module 16, sensor module 22 having at least one environment sensor 24 and being mounted on support structure 20. By means of environment sensors 24, the vehicle environment can be detected for motor vehicle 10 to be driven autonomously. By evaluating the measuring signals of environment sensors 24 by means of a control unit of motor vehicle 10, a respective traffic situation can be detected, such that motor vehicle 10 can autonomously or independently adjust itself to the respective traffic situation and act correspondingly.

The environment sensors can have various designs and comprise a lidar sensor, a radar sensor, a camera, an antenna device and/or another suitable sensor, for example.

Figure 2:
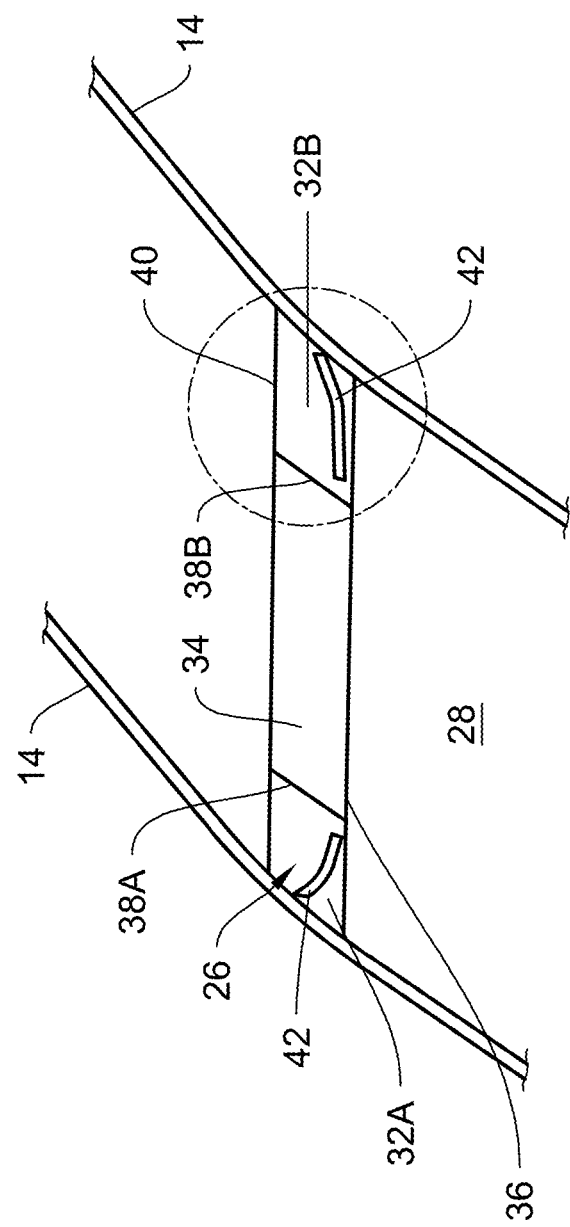
FIG. 2 shows a perspective front view of a front roof portion of the vehicle roof.

As can be seen in particular in FIGS. 1 and 2, roof skin 18 has a front cover 26 which extends between the bilaterally disposed roof side rails 14 and is disposed above a windshield 28. To the rear of cover 26, roof skin 18 forms a fixed roof having a transparent roof portion 30 through which light can enter the interior of the respective vehicle.

Front cover 26 comprises two lateral cover segments 32A and 32B and a center cover element 34 disposed between the two lateral cover elements 32A and 32B. One of sensor modules 22 is disposed below each cover segment 32A and 32B. An additional sensor module, for example, in the form of a camera, can be disposed below cover segment 34. At the front edge, a continuous edge gap 36 extends along cover segments 32A, 32B and 34. An edge gap 38A or 38B is formed between each lateral cover segment 32A and 32B and center cover segment 34. A continuous edge gap 40 is formed on the rear edge of cover segments 32A, 32B and 34, the fixed roof portion having transparent roof portion 30 also adjoining said edge gap 40.

Cover segments 32A and 32B each have a wall portion 42 forming a sensor see-through portion through which respective environment sensor 24 can detect the vehicle environment. Thus, wall portions 42 are transparent for the wavelengths used by environment sensors 24, in particular for a wavelength range between 200 nm and 2000 nm. Transparency is also provided for radar beams.

Each cover element formed by cover segments 32A and 32B is glued onto support structure 20 via a linear glue bead 44 extending in the longitudinal direction of the vehicle and a frame-like glue bead 46. Glue bead 46 circumferentially limits a dry area T, whereas a wet area N is disposed between an inner leg of glue bead 46 extending in the longitudinal direction of the vehicle and glue bead 44.

Sensor module 22 having environment sensor 24 is disposed in dry area T. A temperature controller 48 for sensor module 22 is disposed in wet area N and mounted on support structure 20. Temperature controller 48 comprises a fan 50 and a heat sink 52 and is connected to sensor module 22 via a temperature-control bridge 54, which comprises a cooling line and/or heat pipes by means of which heat can be discharged from sensor module 22.

Front edge gap 36 serves as an inflow gap via which cooling air flows under cover segments 32A and 32B into wet area N to temperature controller 48 during vehicle operation of motor vehicle 10. Thus, the cooling air serves to cool sensor module 22 via temperature-control bridge 54. Edge gap 40 formed on the rear edge of cover segments 32A and 32B serves as an outlet gap via which the cooling air can stream out of wet area N. By means of glue bead 44 and glue bead 46, a flow path of the cooling air flowing in via edge gap 36 is defined in wet area N. It is also conceivable to forgo glue bead 44. In this case, the cooling air can stream out via edge gaps 38A and 38B extending in the longitudinal direction of the vehicle.

FIG. 7 shows an alternative embodiment of a vehicle roof, which largely corresponds to the one according to FIGS. 1 to 6, but is different in that each sensor module 22 having environment sensor 24 is disposed in a wet area N which is disposed below a cover segment 32A or 32B which is glued onto a roof support structure 20 via glue beads 44 and 46 extending in the longitudinal direction of the vehicle. Respective sensor module 22 is provided with a temperature controller 48 which comprises a heat sink 52 and a fan 50 which are also disposed in wet area N. As in the case of the embodiment according to FIGS. 1 to 6, cooling air can flow into wet areas N via a front edge gap 36, which extends in the transverse roof direction and adjoins cover segments 32A and 32B, and cool the respective sensor module 22 by means of fan 50 and heat sink 52. The cooling air can then flow out via rear edge gap 40 extending in the transverse roof direction.

In addition, the vehicle roof according to FIG. 7 corresponds to the one according to FIGS. 1 to 6, which is why reference is made to the description relating thereto in order to avoid repetition.

The invention claimed is:

1. A vehicle roof, comprising:
   a roof skin arrangement which comprises at least one cover element having cover segments and the vehicle roof comprising at least one sensor module having at least one environment sensor for detecting a vehicle environment which is at least partially covered by the cover element,
   the cover element being limited by an edge gap via which air for the sensor module flows under the cover element, and
   wherein one inflow gap and/or outlet gap for air is formed between each cover segment.

2. The vehicle roof according to claim 1, wherein the edge gap extends in the transverse roof direction.

3. The vehicle roof according to claim 1, wherein the cover element defines a front edge or a rear edge of the vehicle roof.

4. The vehicle roof according to claim 1, wherein the roof skin arrangement comprises a front cover extending in the transverse roof direction having a plurality of said several cover segments, which covers the sensor module at least partially.

5. The vehicle roof according to claim 1, wherein a flow path of the air below the cover element is defined by at least two glue beads and/or at least one separating wall via which the cover element is connected to a support structure.

6. The vehicle roof according to claim 1, wherein the sensor module is connected to a temperature controller which is disposed in the air flow path.

7. A vehicle roof, comprising:
   a roof skin arrangement which comprises at least one cover element and the vehicle roof comprising at least one sensor module having at least one environment sensor for detecting a vehicle environment which is at least partially covered by the cover element,
   the cover element being limited by an edge gap via which air for the sensor module flows under the cover element,
   wherein the sensor module is connected to a temperature controller which is disposed in the air flow path, and
   wherein the temperature controller is disposed in a wet area and the sensor module is disposed in a dry area and the temperature controller and the sensor module are connected to each other via a temperature-control bridge.

8. The vehicle roof according to claim 7, wherein the temperature-control bridge comprises a cooling line and/or a heat pipe.

9. The vehicle roof according to claim 6, wherein the temperature controller comprises a fan.

10. The vehicle roof according to claim 6, wherein the temperature controller comprises a heat sink.

11. The vehicle roof according to claim 1, wherein the roof is a roof module.

12. A motor vehicle comprising a vehicle roof according to claim 1.

* * * * *